United States Patent
Calle et al.

(10) Patent No.: US 9,227,221 B2
(45) Date of Patent: Jan. 5, 2016

(54) HYDROPHILIC-CORE MICROCAPSULES AND THEIR FORMATION

(75) Inventors: Luz M. Calle, Merritt Island, FL (US); Wenyan Li, Orlando, FL (US); Jerry W. Buhrow, Viera, FL (US); Scott T. Jolley, Titusville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 683 days.

(21) Appl. No.: 12/856,849

(22) Filed: Aug. 16, 2010

(65) Prior Publication Data

US 2010/0320421 A1 Dec. 23, 2010

Related U.S. Application Data

(63) Continuation-in-part of application No. 11/239,445, filed on Sep. 19, 2005, now Pat. No. 7,790,225.

(51) Int. Cl.
*B05D 5/06* (2006.01)
*B05D 5/00* (2006.01)
*B01J 13/14* (2006.01)
*B01J 13/16* (2006.01)
*C04B 20/10* (2006.01)
*C04B 40/06* (2006.01)
*C09B 67/02* (2006.01)
*C09D 5/08* (2006.01)
*C09D 7/12* (2006.01)
*C08K 9/10* (2006.01)

(52) U.S. Cl.
CPC . *B05D 5/00* (2013.01); *B01J 13/14* (2013.01); *B01J 13/16* (2013.01); *C04B 20/1029* (2013.01); *C04B 40/0641* (2013.01); *C09B 67/0097* (2013.01); *C09D 5/082* (2013.01); *C09D 7/1291* (2013.01); *B05D 5/06* (2013.01); *B05D 2202/00* (2013.01); *C08K 9/10* (2013.01)

(58) Field of Classification Search
None
See application file for complete search history.

(56) References Cited

U.S. PATENT DOCUMENTS

| | | | | | |
|---|---|---|---|---|---|
| 3,928,272 | A | * | 12/1975 | Brancato et al. | 528/232 |
| 4,273,671 | A | | 6/1981 | Allinikov | |
| 4,533,599 | A | * | 8/1985 | Okumura et al. | 428/402.21 |
| 4,534,783 | A | * | 8/1985 | Beestman | 71/27 |
| 4,956,129 | A | * | 9/1990 | Scher et al. | 264/4.7 |

(Continued)

OTHER PUBLICATIONS

A. Kumar, et al., "Smart Coatings," 23rd Army Science Conference, Orlando, FL, Dec. 2002, www.asc2002.com/summaries/a/AP-16.pdf.

(Continued)

*Primary Examiner* — Mandy Louie
(74) *Attorney, Agent, or Firm* — Michelle L. Ford; Jennifer P. Yancy (57) ABSTRACT

Hydrophilic-core microcapsules and methods of their formation are provided. A hydrophilic-core microcapsule may include a shell that encapsulates water with the core substance dissolved or dispersed therein. The hydrophilic-core microcapsules may be formed from an emulsion having hydrophilic-phase droplets dispersed in a hydrophobic phase, with shell-forming compound contained in the hydrophilic phase or the hydrophobic phase and the core substance contained in the hydrophilic phase. The shells of the microcapsules may be capable of being broken down in response to being contacted by an alkali, e.g., produced during corrosion, contacting the shell.

24 Claims, 3 Drawing Sheets

(56) References Cited

U.S. PATENT DOCUMENTS

| | | | |
|---|---|---|---|
| 5,364,634 A * | 11/1994 | Lew | A61K 8/11 424/434 |
| 5,840,800 A * | 11/1998 | Joffre et al. | 524/806 |
| 6,022,501 A | 2/2000 | Dexter et al. | |
| 6,075,072 A | 6/2000 | Guilbert et al. | |
| 6,080,334 A | 6/2000 | Heimann et al. | |
| 6,113,935 A * | 9/2000 | Rodson et al. | 424/408 |
| 6,225,372 B1 * | 5/2001 | Lykke et al. | 523/201 |
| 6,235,810 B1 * | 5/2001 | Pavlyuchenko et al. | 523/201 |
| 6,280,485 B1 * | 8/2001 | Daly et al. | 44/301 |
| 6,544,540 B2 | 4/2003 | Van Koppenhagen | |
| 6,630,596 B2 * | 10/2003 | Boer | 549/253 |
| 6,716,526 B2 | 4/2004 | Weston et al. | |
| 6,933,046 B1 | 8/2005 | Cook | |
| 7,192,993 B1 | 3/2007 | Sarangapani et al. | |
| 2002/0004059 A1 * | 1/2002 | Van Koppenhagen et al. | 424/408 |
| 2002/0081431 A1 | 6/2002 | Schmdt | |
| 2002/0136773 A1 * | 9/2002 | Scher et al. | 424/497 |
| 2003/0068824 A1 | 4/2003 | Frankel et al. | |
| 2004/0129435 A1 * | 7/2004 | Parrish | 169/44 |
| 2005/0023505 A1 * | 2/2005 | Blakemore et al. | 252/176 |
| 2006/0166838 A1 * | 7/2006 | Collins et al. | 507/219 |
| 2011/0147961 A1 * | 6/2011 | Schwantes | 264/4.7 |

OTHER PUBLICATIONS

M. Kendig, "Past, Present and Future 'Smart' Protective Coatings," Conference Advanced Research & Development of Coatings for Corrosion Protection: Offshore Oil & Gas Operations Facilities, Marine Pipeline & Ship Structures, Apr. 14-16, 2004, Biloxi, MS, Organized by Colorado School of Mines.

H. Yang, et al., "Plasma Deposition of Polymeric Thin Films on Organic Corrosion-Inhibiting Paint Pigments: A Novel Method to Achieve Slow Release," Plasmas and Polymers, 8(4): 297-323 Dec. 2003.

M. Kendig, et al., "Smart Corrosion Inhibiting Coatings," Progress in Organic Coatings 47, 183 (2003).

* cited by examiner

HYDROPHILIC-CORE MICROCAPSULES AND THEIR FORMATION

RELATED APPLICATION

This application is related to co-pending application referenced as KSC-13226 entitled "Hydrophobic-Core Microcapsules and their Formation" filed concurrently, and is a continuation-in-part of U.S. patent application Ser. No. 11/239,445 entitled "Coatings and Methods for Corrosion Detection and/or Reduction," filed Sep. 19, 2005, the contents of which are commonly assigned and incorporated herein by reference.

STATEMENT OF GOVERNMENT INTEREST

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates generally to microcapsules, and, in particular, the present invention relates to hydrophilic-core microcapsules and their formation.

BACKGROUND OF THE INVENTION

Metals and metal alloys are present in some shape or form in nearly every facet of our lives. Many metals and metal alloys are subject to corrosion that causes these metals and metal alloys to lose their structural integrity. As such, methods have been developed to detect the presence of corrosion and to inhibit corrosion.

For example, color or fluorescent indicators have been combined directly with liquid coating materials, such as paints, temporary coating materials, etc., to indicate corrosion, based on the pH or electrical changes associated with corrosion, when the coating materials are applied to corrosion containing surfaces. However, problems, such as the solubility of the indicator in a coating material and/or chemical reactions, interference with the coating material, etc., can arise when an indicator is combined directly with a coating material. Another problem is that the indicator may not be compatible with the coating material and may negatively affect the coating capability of the coating material when the indicator is combined directly with the coating material.

Nondestructive evaluation methods, such as X-ray techniques, including X-ray scattering and X-ray absorption spectroscopy, are sometimes used to detect the presence of corrosion under coatings. However, the resolution and/or sensitivity of such methods can make it difficult to detect corrosion in its early stages. In addition, these techniques can be excessively time intensive and typically require bulky, expensive equipment.

Corrosion inhibitors have also been combined directly with coating materials. However, directly combining a corrosion inhibitor with a coating material can lead to compatibility issues between the corrosion inhibitor and the coating material that can negatively affect the coating properties and/or reduce the corrosion protection capability of the corrosion inhibitor.

Microcapsules, containing a corrosion inhibitor, have been added to protective coatings, such as paints, that are applied to metal surfaces and dried. The microcapsules have a frangible wall material that confines the corrosion inhibitor until the dried coating is subjected to a mechanical force, due to an impact, abrasion, or cutting, etc., sufficient to fracture and fragment the wall material. When the fracture occurs, the corrosion inhibitor leaks into and spreads through damage sites to provide corrosion protection. However, there can be other defects in a coating applied to a surface besides those caused by mechanical forces, such as air bubbles occurring in the coating, pin holes occurring in the coating, uneven coating thickness, poor coating adhesion to an unclean metal substrate, poor coating adhesion at corners, etc., that can result in corrosion of the metal. In addition, the frangible capsules may include a dye that marks the damage sites for notice and possible detailed repair, but the dye is only released in response to the fracture of the capsules and indicates mechanical damage that could possibly, but not necessarily, result in corrosion.

SUMMARY OF THE INVENTION

Hydrophilic-core microcapsules and methods of their formation are provided. A hydrophilic-core microcapsule including a shell that encapsulates a core substance which can be dissolved or dispersed in a hydrophobic material, such as dye, corrosion indicator, corrosion inhibitor, film forming compound, healing agent, or various combinations thereof. Hydrophilic-core microcapsules may be formed from an emulsion having hydrophilic-phase dispersed in a hydrophobic phase, with shell-forming compounds contained in the hydrophilic phase or the hydrophobic phase and the core substance contained in the hydrophilic phase. The shells of the hydrophilic-core microcapsules are broken down in response to being contacted by an alkali, e.g., produced during corrosion, contacting the shell. The hydrophilic-core microcapsules may be dispersed in a coating formulation, such as paint.

DETAILED DESCRIPTION OF THE INVENTION

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and chemical changes may be made without departing from the scope of the present invention. The following detailed description is, therefore, not to be taken in a limiting sense, and the scope of the present invention is defined only by the appended claims and equivalents thereof.

Figure 1:
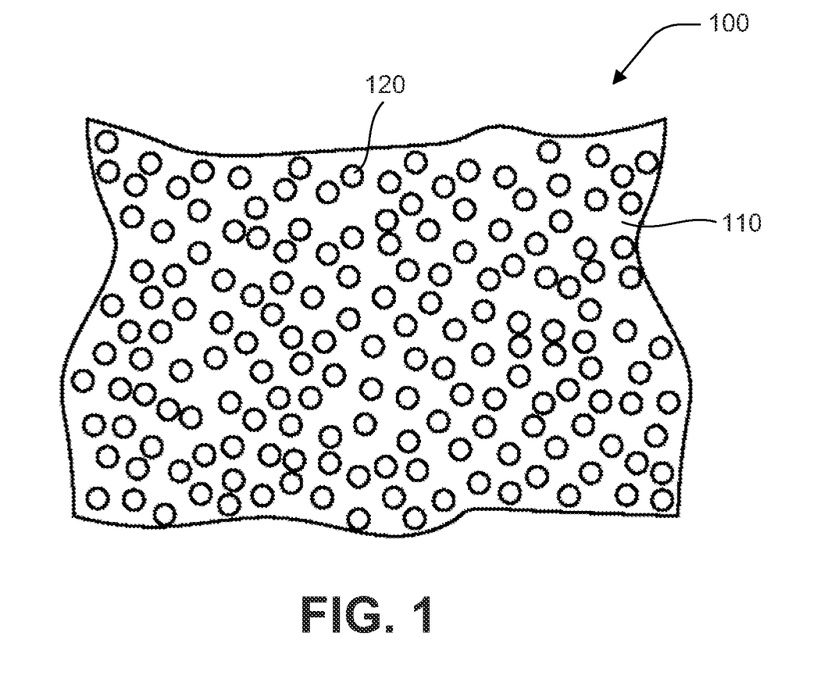
FIG. 1 illustrates a coating, according to an embodiment.

FIG. 1 illustrates a coating 100, according to an embodiment. Coating 100 includes a coating vehicle 110, such as clear or opaque paint, aqueous gel, water, etc., having microcapsules 120 dispersed within the coating vehicle 110, e.g., by mixing. For embodiments including the aqueous gel, coating 100 may be a temporary coating. For another embodiment, coating vehicle 110 may be a solvent, such as an aliphatic hydrocarbon, e.g., aliphatic petroleum distillates.

Figure 2:
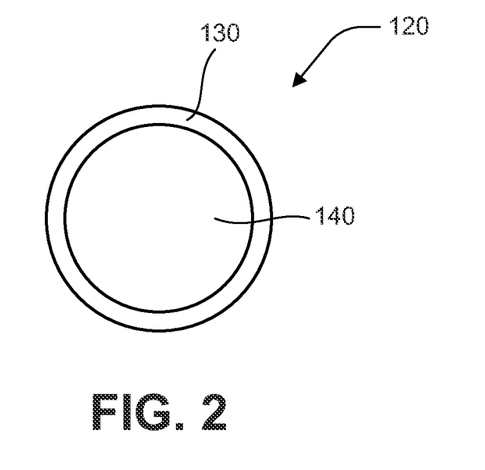
FIG. 2 illustrates a spherical microcapsule, according to another embodiment.

FIG. 2 is an enlarged view of a microcapsule 120, according to another embodiment. Microcapsule 120 includes a shell 130 that contains an encapsulant 140 (e.g., core material), such as one or more corrosion indicators, corrosion inhibitors, film-forming compounds, healing agents, or various combinations thereof. Encapsulant 140 may be a liquid, solid, or a gas entrapped in aerogel or various combinations thereof. For some embodiments, encapsulant 140 (e.g., which may be referred to as a core of the microcapsule) may include a hydrophobic substance, such as oil, or a hydrophilic substance, such as water, with one or more active substances such as corrosion indicator, corrosion inhibitor, film-forming compound, healing agent, or various combinations thereof dissolved or dispersed therein. For some embodiments, encapsulant 140 (e.g., core of the microcapsule) may contain only the active substances such as corrosion indicator, corrosion inhibitor, film-forming compound, healing agent, or various combinations thereof.

A suitable film-forming compound may be a clear varnish, such as an acrylic varnish. A suitable indicator may be a pH indicator that changes color over the alkaline region, e.g., pHs from about 8 to about 10, such as phenolphthalein. Another suitable indicator is one that fluoresces, such as 7-hydroxycoumarin, coumarin, Rhodamine B, etc., in the presence of or upon the oxidation of a metal or in the presence or upon the formation of a metal cation complex. A suitable corrosion inhibitor may be sodium nitrate, camphor, polyamine fatty acid salts in a solvent (such as toluene, vegetable oil, etc.), sodium molybdate, cerium nitrate, sodium phosphate, calcium metaborate, or the like. Suitable healing agents may include epoxy resin and its hardeners, siloxane resin and its catalysts, any one part coating suspension in a solvent or two-part coating system that would cure at room temperature, or the like.

For some embodiments, microcapsules 120 may be substantially spherical as shown in FIG. 2.

Shell 130 is broken down or disintegrates in the presence of a base (such as an alkali), e.g., having a pH above about 8, for releasing encapsulant 140. That is, shell 130 is pH sensitive and breaks down by interacting with a compound, such as an alkali, having a particular pH. For example, shell 130 breaks down and releases its contents when an alkali produced during a corrosion reaction contacts shell 130.

A microcapsule 120 may be formed by forming an emulsion having droplets of a hydrophilic substance, such as water and water soluble compounds, dispersed in a hydrophobic phase, e.g., toluene, vegetable oil, xylene, mineral oil, or a mixture of hydrocarbons, e.g., diesel fuel, or any other non-water soluble organic material. Microcapsules, such as microcapsules 120, formed from emulsions with hydrophilic droplets (e.g., water) dispersed in a continuous (e.g., substantially continuous) hydrophobic phase may be termed hydrophilic (e.g., water core microcapsules.

A surfactant, such as an oil-soluble surfactant, is added to the emulsion to disperse the water in the oil. A pre-polymer, such as an amino resin pre-polymer, a cross-linking agent having one or more ester and mercapto groups that are broken down under basic conditions, and one or more core materials are added to the hydrophilic phase. A catalyst, such as an organic acid, is added to the hydrophobic phase. The emulsion is heated, causing a polymerization reaction to occur at the water-oil interface, which forms shell 130 around encapsulant 140. Such a process is known as an interfacial polymerization process.

It is the interaction of alkaline conditions with the shell material that causes shell 130 to break down under alkaline conditions. Alternatively, encapsulant 140 can be released mechanically, such as by scratching or compressing a surface to which coating 100 is applied.

A basic condition, e.g., alkaline, often forms in the presence of corrosion in a metal or a metal alloy. A basic condition often forms next to corrosion-induced pits, crevices, etc. For example, as is known in the art, when a drop of salt water is applied to steel, the anodic reaction occurs to produce a rust spot, and the cathodic reaction (the reduction reaction of the oxygen in the presence of water) occurs to produce a basic condition. Therefore, when coating 100 is applied to a metal surface, and if corrosion occurs, shells 130 of the microcapsules 120 can be exposed to the basic condition (e.g., alkaline) and will break down under the basic condition resulting from the corrosion, thereby releasing encapsulant 140. Hereinafter, corrosion will refer to any chemical or electrochemical process involving the deterioration or degradation of metals, including pitting, crevice corrosion, dissimilar metal corrosion, or the like.

For one embodiment, coating 100 is temporarily applied to a metal surface by spraying or brushing, to detect whether corrosion has occurred. Examples of a metal surface include a bare metal surface, a metal surface coated with paint, varnish, epoxy, etc., a metal coated with a previous application of coating 100, or the like. For example, a coating containing the microcapsules disclosed herein may be applied as a primer coating, a top coating, or an intermediate coating between a primer coating and a top coating. Other examples of a metal surface include metal or metal alloy, e.g., a ferrous metal or alloy. For this embodiment, coating vehicle 110 is an aqueous gel and encapsulant 140 includes a suitable indicator, such as the pH indicator or florescent indicator as described above. In the presence of corrosion, the shells 130 of the microcapsules 120 break down, releasing the indicator. The pH indicator will change color or the florescent indicator will fluoresce to indicate the presence of corrosion. Another example of a temporary coating is a water suspension of microcapsules 120.

Coating vehicle 110 is not limited to an aqueous gel, or other temporary coatings, but can be a clear paint or varnish, opaque paint or varnish, etc. that is substantially permanently applied to the metal surface by spraying, brushing, or rolling, for example. For another embodiment, coating 100 is applied substantially permanently to a bare metal surface as a primer coat that may be clear coated.

For some embodiments, where coating 100 is substantially permanently applied, encapsulant 140 may include the indicator or the corrosion inhibitor or both. For other embodiments, encapsulant 140 may include the indicator, the healing agent, or the corrosion inhibitor, or various combinations thereof. If corrosion occurs, encapsulant 140, due to shells 130 breaking down in the presence of the basic condition resulting from the corrosion, is released, and the corrosion inhibitor acts to prevent further corrosion, while the indicator indicates the corrosion location. For another embodiment, a trauma, such as a scratch, an impact, etc., to coating 100 may act to expose metal. The trauma can also break shells 130 so as to release corrosion inhibitor that acts to reduce the degree of the corrosion of the exposed metal.

For another embodiment, where coating 100 is substantially permanently applied, encapsulant 140 may include the film-forming compound; the film-forming compound and corrosion inhibitor; the film-forming compound, corrosion inhibitor, and indicator; the film-forming compound and healing agent; the film-forming compound, indicator, and healing agent; or the film-forming compound and the indicator. For example, encapsulant 140 may include the film-forming compound, corrosion inhibitor, indicator, healing agent, or various combinations thereof. For one embodiment, if coating 100 is exposed to trauma that causes shells 130 to break, the film-forming compound covers at least a portion of the trauma and acts to reduce the degree of any exposed metal of corroding. For some embodiments, the corrosion inhibitor acts to further reduce the degree of corrosion of any exposed metal.

Note that if corrosion occurs at locations away from the trauma location due to small breaks in the coating, such as chips, or other coating defects, corrosion inhibitor and film-forming compound will be released due to shells 130 breaking down in the presence of the basic condition, resulting from the corrosion. In other embodiments, the indicator will indicate the presence of the corrosion.

For some embodiments, the different functions of the core components can be incorporated into a coating by encapsulating different core components into the same capsules, or by incorporating different capsules with different components within the coating. For example, a portion of microcapsules 120 in coating 100 may contain corrosion inhibitor and/or the healing agent and another portion of microcapsules 120 in coating 100 may contain indicator. In another example, a portion of microcapsules 120 in coating 100 may contain corrosion inhibitor and/or the healing agent, another portion of microcapsules 120 in coating 100 may contain indicator, and yet another portion of microcapsules 120 in coating 100 may contain film-forming compound. In another example, a portion of microcapsules 120 in coating 100 may contain film-forming compound and another portion of microcapsules 120 in coating 100 may contain indicator. For some embodiments, microcapsules 120 having different contents are randomly distributed within coating vehicle 110 so that microcapsules 120 having the different functions of indicating, inhibiting, healing, and/or film-forming may be adjacent each other, as well as microcapsules 120 having like functions being adjacent each other.

Hydrophilic-core microcapsules, such as water-core microcapsules, may be formed from emulsions having hydrophilic-phase droplets dispersed in a hydrophobic substance. One example is water-in-oil emulsions. Water-in-oil emulsions include hydrophilic-phase droplets (e.g., as the dispersed phase) dispersed in the hydrophobic phase (e.g., as the continuous phase). If a compound (active substance) is hydrophilic, or it can be dissolved or dispersed in a hydrophilic solvent (e.g. water), then it is possible to encapsulate it in hydrophilic- (e.g., water-) core microcapsules. When a compound does not have sufficient solubility in the hydrophilic solvent, a co-solvent may be used to improve the dissolution of the compound and to facilitate the encapsulation process. Similarly, when a compound cannot be dispersed into the hydrophilic phase to form a reasonably stable suspension (e.g., indicated by droplets of the compound being dispersed throughout the hydrophilic phase and the compound remaining dispersed during emulsion formation and encapsulation processes), a surfactant may be used to improve the dispersion of the compound and facilitate the encapsulation process. So if a compound can be dissolved or dispersed in a hydrophilic solvent, with or without the aid of a co-solvent or a surfactant, it is possible to encapsulate it into hydrophilic-core microcapsules.

Hydrophilic-core microcapsules are typically used for encapsulating water-soluble materials, but not oil-soluble materials, such as non-polar molecules. Oil-soluble materials can be incorporated into hydrophilic-core microcapsules by first adding them to a co-solvent, and then adding the resulting solution to the hydrophilic phase. Alternatively, a surfactant can be added to the hydrophilic phase. This will dissolve or disperse the non-polar or oil-soluble reagents into the hydrophilic phase. The emulsion (e.g. water-in-oil emulsion) can then be formed by adding the hydrophilic phase to a hydrophobic phase and a reaction can be initiated to encapsulate the oil, with the active substance dissolved or dispersed therein, into the core of the hydrophilic-core microcapsules.

In general, oil-core as well as water-core microcapsules include an encapsulant contained within a shell (shell 130), such as a polymeric shell (FIG. 2). Alternatively, the core (encapsulant 140) of an oil-core microcapsule may include a hydrophobic substance, such as oil, an active substance dissolved in the oil, with or without the aid of a co-solvent, or an active substance dispersed in the oil, with or without the aid of a surfactant. The active substance dissolved or dispersed in the encapsulated oil may include a dye, a corrosion indicator, a corrosion inhibitor, a film-forming compound, a healing agent, or various combinations thereof. The encapsulant 140, of a water-core microcapsule, may include water, an active substance dissolved in the water, with or without the aid of a co-solvent, or an active substance dispersed in the water, with or without the aid of a surfactant. The active substance dissolved or dispersed in the encapsulated water may include a dye, a corrosion indicator, a corrosion inhibitor, a film-forming compound, a healing agent, or various combinations thereof.

The polymeric shell of either oil-core or water-core microcapsules may include a polymer formed from a shell-forming compound (e.g., shell-forming precursor) that comprises, consists of, or consists essentially of a cross-linking agent having one or more ester and mercapto groups and/or a film-forming pre-polymer. The shell-forming compound may comprise, consist of, or consist essentially of about 5 to about 75 percent (e.g., about 20 to about 50 percent) by mass of a cross-linking agent and about 25 to about 95 percent (e.g., about 50 to about 80 percent) by mass of a film-forming pre-polymer. Examples of the cross-linking agent include, but are not limited to, pentaerythritol tetrakis(2-mercaptoacetate) or compounds with similar structure (e.g., pentaerythritol tetrakis(3-mercaptopropionate) (PTT), pentaerythritol, dipentaerythritol, dipentaerythritol pentaacrylate tetra(mercaptoacetate), pentaerythritol tetra(acrylate), and their derivatives. Examples of the film-forming pre-polymer include, but are not limited to, urea formaldehyde pre-polymer resin (e.g., butylated urea-formaldehyde resin, such as CYMEL® U80), melamine formaldehyde resin, polyurethane prepolymers, polyols, or film forming monomers, such as urea and formaldehyde solution, melamine and formaldehyde solution, isocyanates and various glycols, etc. Note that the shell-forming compound forms the shells of the oil-core as well as the water-core microcapsules.

The microcapsule shell of either oil-core or water-core microcapsules may include one or more chemical bonds due to the ester group in the cross-linking agent that are cleavable (e.g., broken down) at ambient temperature when the surrounding pH changes due to the occurrence of a corrosion process. For example, the ester groups may undergo an irreversible hydrolysis reaction under basic pH, e.g., when exposed to an alkali.

Pentaerythritol tetrakis(2-mercaptoacetate)-type molecules are normally not a good film former by themselves. As such, the film-forming pre-polymers, such as urea formaldehyde or melamine formaldehyde pre-polymers serve as the precursor that provides the structural integrity of the capsule shell.

Cross-linking agents that have three or four functional groups, such as pentaerythritol tetrakis(2-mercaptoacetate), penta erythritol tetrakis(3-mercaptopropionate) (PTT), pentaerythritol, dipentaerythritol, dipentaerythritol pentaacrylate tetra(mercaptoacetate), and pentaerythritol tetraacrylate can also provide chemical resistance (e.g. solvent resistance) to the microcapsule shells.

Figure 3:
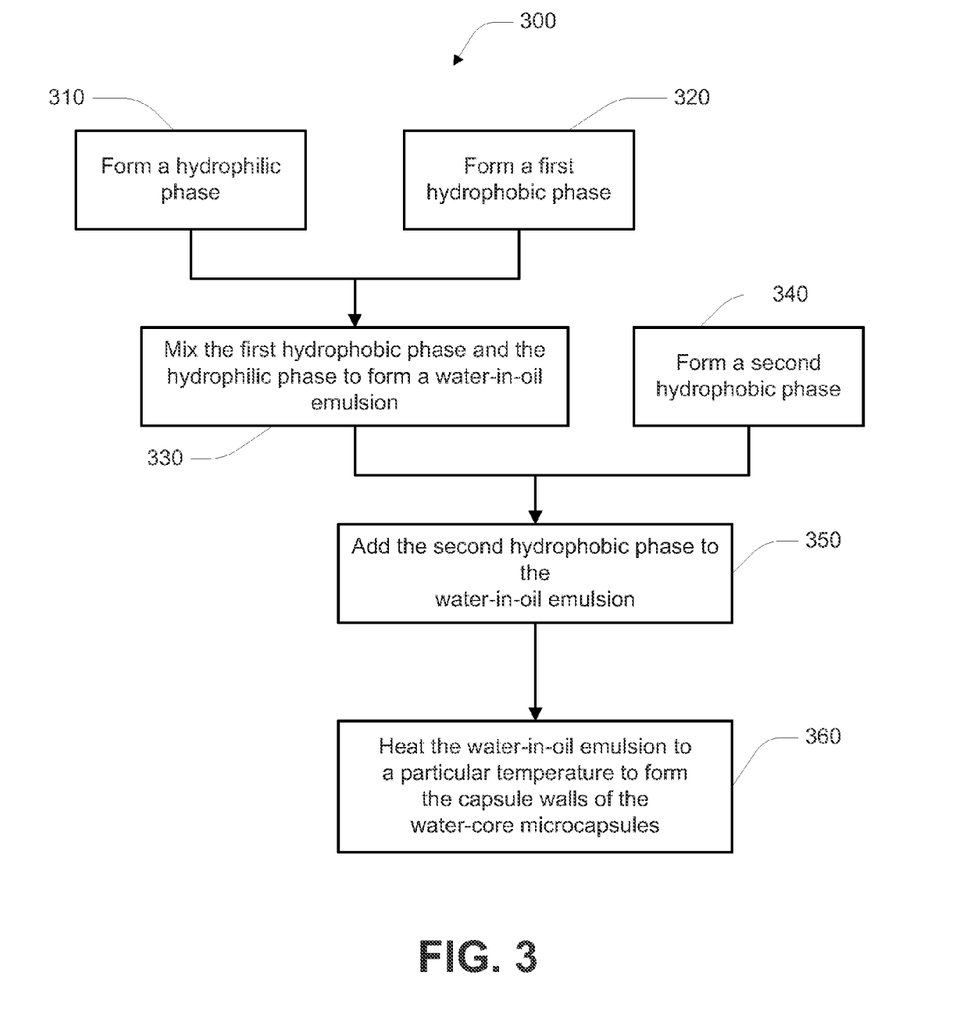
FIG. 3 presents a flowchart of a method for forming hydrophilic-core microcapsules.

FIG. 3 is flowchart of an example process 300 for forming hydrophilic- (e.g., water-) core microcapsules. For example, process 300 may be considered as a process of forming hydrophilic-core microcapsules with a wall forming material in a hydrophobic. At block 310, a hydrophilic phase is formed, e.g., by adding a catalyst, such as $4N\ H_2SO_4$, to water. For example, the $4N\ H_2SO_4$ may be added, e.g., a drop at a time, to the water until the pH is about 2 to about 4. In addition, a corrosion inhibitor, such as sodium molybdate ($Na_2MoO_4$), cerium nitrate $Ce(NO_3)_3$, sodium phosphate ($Na_3PO_4$), calcium metaborate ($CaB_2O_4$), etc., may be added to the hydrophilic phase. For example, the hydrophilic phase to which the catalyst is added may include about zero to about 10 percent, by mass, corrosion inhibitor and about 90 to about 100 percent, by mass, water.

A first hydrophobic phase is formed at block 320. For example, the first hydrophobic phase may be formed by adding surfactants, such as sorbitan trioleate (SPAN® 85) and AEROSOL® OT (AOT) or an alkyl anhydride (Lubrizol ADX101K), to oil, such as toluene, e.g. during mixing. In other embodiments, the first hydrophobic phase may include the alkyl anhydride and methyl myristate as the hydrophobic material. For one embodiment, the first hydrophobic phase may be about 70 to about 90 percent, by mass, oil and about 10 to about 30 percent, by mass, surfactant.

The hydrophilic phase is then added to the first hydrophobic phase, e.g., a drop at a time, to form a water-in-oil emulsion at block 330. For example, the hydrophilic phase may be mixed into the first hydrophobic phase so that hydrophilic-phase droplets are dispersed within the first hydrophobic phase. A second hydrophobic phase is formed at block 340 by adding a shell-forming compound, e.g., comprising, consisting of, or consisting essentially of pre-polymer, such as CYMEL® U80, and cross-linking agent, such as penta erythritol tetrakis(3-mercaptopropionate) (PTT), to oil, such as toluene or a mixture of toluene and methyl myristate, e.g., while stirring. For one embodiment, the second hydrophobic phase may be about 88 to about 92 percent, by mass, oil, about 4 to about 7 percent, by mass, pre-polymer, and about 4 to about 5 percent, by mass, cross-linking agent.

At block, 350, the second hydrophobic phase is then added to the water-in-oil emulsion formed at block 330, e.g., a drop at a time. At this point, the water-in-oil emulsion includes hydrophilic-phase droplets dispersed in a continuous hydrophobic phase that includes the first and second hydrophobic phases. For example, the water-in-oil emulsion may include about 40 to about 55 percent, by mass, hydrophobic phase I; about 30 to about 35 percent, by mass, hydrophobic phase II; and about 10 to about 30 percent, by mass, water.

At block 360, the water-in-oil emulsion, containing the second hydrophobic phase (e.g., dissolved in the first hydrophobic phase), is heated to a particular temperature, causing a polymerization reaction that forms a microscopic shell. For example, the emulsion may be heated to temperature of about 70° C. and may be maintained at about 70° C. for a particular time, e.g., a reaction time that lies in the range of about 3 to about 5 hours.

Examples 1-9

Preparation of Hydrophilic-Core Microcapsules with Wall Forming Material in Hydrophobic Phase (e.g. Oil Phase)

In Example 1, as shown in Table 1, the water phase was prepared by adding $4N\ H_2SO_4$ to water, a drop at a time, until the pH was about 3.5. An oil phase I was formed by adding sorbitan trioleate (SPAN® 85) and AEROSOL® OT (AOT) to toluene while mixing. The water phase was then added to the oil phase I, a drop at a time, as the water phase was stirred to produce a water-in-oil emulsion. An oil phase II was formed by adding CYMEL® U80 and PTT to toluene while stirring. Oil phase II was then added to the water-in-oil emulsion, a drop at a time, to produce a water-in-oil emulsion. The water-in-oil emulsion was then heated to about 70° C. to initiate an interfacial polymerization reaction. The water-in-oil emulsion was maintained at about 70° C. for reaction time of about 3 to about 4 hours to form water-core microcapsules.

TABLE 1

| Example 1 formula for empty water-core microcapsules | |
|---|---|
| | Weight (gram) |
| Water phase | |
| $4NH_2SO_4$ | adjust pH to 3.5 |
| water | 150 |
| Oil Phase (I) | |
| AOT | 20 |
| Span85 | 10 |
| Toluene | 216.8 |
| Oil phase (II) | |
| U80 | 12 |
| PTT | 8 |
| Toluene | 173.4 |

In Example 2, Table 2, sodium molybdate ($Na_2MoO_4$) was dissolved in water to produce a water phase. $4N\ H_2SO_4$ was then added to the water phase until the pH of the water phase was about 3.5. An oil phase I was formed by adding SPAN® 85 and AOT to toluene while mixing. The water phase was then added to the oil phase I, a drop at a time, as the water phase was stirred to produce a water-in-oil emulsion.

An oil phase II was formed by adding CYMEL® U80 and PTT to toluene while stirring. Oil phase II was then added to the water-in-oil emulsion, a drop at a time, to produce a water-in-oil emulsion.

The water-in-oil emulsion was then heated to about 70° C. to initiate an interfacial polymerization reaction. The water-in-oil emulsion was maintained at about 70° C. for a reaction time of about 3 to about 4 hours to form water-core microcapsules having shells encapsulating a core of sodium molybdate dissolved in water.

TABLE 2

Example 2 Formula for water-core microcapsules with Na₂MoO₄

| | Weight (gram) |
|---|---|
| Water phase | |
| 4NH2SO₄ | adjust pH to 3.5 |
| water | 150 |
| Na₂MoO₄•2H2O | 0.072 |
| Oil Phase (I) | |
| AOT | 20 |
| Span85 | 10 |
| Toluene | 216.8 |
| Oil phase (II) | |
| U80 | 12 |
| PTT | 8 |
| Toluene | 173.4 |

In Example 3, Table 3, cerium nitrate $Ce(NO_3)_3$ was dissolved in water to produce a water phase. $H_2SO_4$ was then added to the water phase until the pH of the water phase was about 3.5. An oil phase I was formed by adding SPAN® 85 and AOT to toluene while mixing. The water phase was then added to the oil phase I, a drop at a time, as the water phase was stirred to produce a water-in-oil emulsion. An oil phase II was formed by adding CYMEL® U80 and PTT to toluene while stirring. Oil phase II was then added to the water-in-oil emulsion, a drop at a time, to produce a water-in-oil emulsion. The water-in-oil emulsion was then heated to about 70° C. to initiate a polymerization reaction. The water-in-oil emulsion was maintained at about 70° C. for a reaction time of about 3 to about 4 hours to form water-core microcapsules having shells encapsulating cerium nitrate.

TABLE 3

Example 3 Formula for water-core microcapsules with Ce(NO₃)₃

| | Weight (gram) |
|---|---|
| Water phase | |
| 4NH2SO₄ | adjust pH to 3.5 |
| water | 150 |
| Ce(NO₃)₃•6H₂O | 0.067 |
| Oil Phase (I) | |
| AOT | 20 |
| Span85 | 10 |
| Toluene | 216.8 |
| Oil phase (II) | |
| U80 | 12 |
| PTT | 8 |
| Toluene | 173.4 |

For some water-in-oil emulsions, the major sources of interactions between water-phase droplets are through London dispersion forces or simple steric effects between the surfactant molecules. These interactions are weak and are not as effective at keeping the water-phase droplets from clustering, thus making it difficult to incorporate the microcapsules into coating formulations, such as paints. However, it is possible to obtain water-in-oil emulsions that are relatively stable, e.g., good dispersion of water-phase droplets with little clustering, when the right water/surfactant/oil combination is used. For example, it was discovered that water, a surfactant (such as the alkyl anhydride), and oil (such as methyl myristate), is a good combination to form a water-in-oil emulsion that forms a stable emulsion (e.g., indicated by droplets of the water phase being substantially uniformly dispersed throughout the oil phase) with a substantially mono-dispersed size distribution and a dispersed phase size lying in the range of about one micron to about five microns.

In Example 4, Table 4, cerium nitrate $Ce(NO_3)_3$ was dissolved in water to produce a water phase. 4N $H_2SO_4$ was then added to the water phase until the pH of the water phase was about 2.8. An oil phase I was formed by dissolving the alkyl anhydride (Lubrizol ADX101K) in methyl myristate while mixing. The water phase was then added to the oil phase I, a drop at a time, to produce a water-in-oil emulsion. An oil phase II was formed by adding CYMEL® U80 and PTT to methyl myristate oil and toluene while stirring. Oil phase II was then added to the water-in-oil emulsion, a drop at a time, to produce a water-in-oil emulsion. The water-in-oil emulsion was then heated to about 70° C. to initiate an interfacial polymerization reaction. The water-in-oil emulsion was maintained at about 70° C. for a reaction time of about 4.5 hours to form water-core microcapsules having shells encapsulating a core of cerium nitrate dissolved in water.

TABLE 4

Example 4 formula for water-core microcapsules with Ce(NO₃)₃.

| | Weight (gram) |
|---|---|
| Water Phase | |
| Water (pH ~2.8) | 80 |
| Ce(NO₃)₃•6H₂O | 0.05 |
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| heating | 70° C. for 4.5 hours |

In Example 5, Table 5, cerium nitrate $Ce(NO_3)_3$ was dissolved in water to produce a water phase. 4N $H_2SO_4$ was then added to the water phase, a drop at a time, until the pH of the water phase was about 2. An oil phase I was formed by dissolving the Lubrizol ADX101K in methyl myristate while mixing. The water phase was then added to the oil phase I, a drop at a time, to produce a water-in-oil emulsion. An oil phase II is formed by adding CYMEL® U80 and PTT to methyl myristate and toluene while stirring. Oil phase II was then added to the water-in-oil emulsion, a drop at a time, to produce a water-in-oil emulsion. The water-in-oil emulsion was then heated to about 70° C. to initiate an interfacial polymerization reaction. The water-in-oil emulsion was maintained at about 70° C. for a reaction time of about 17 hours to form water-core microcapsules having shells encapsulating a core of cerium nitrate dissolved in water.

TABLE 5

Formula for Example 5 water-core microcapsules with higher concentration Ce(NO₃)₃.

| | Weight (gram) |
|---|---|
| Water phase | |
| Water (pH ~2) | 80 |
| Ce(NO₃)₃•6H₂O | 0.3 |

TABLE 5-continued

Formula for Example 5 water-core microcapsules with higher concentration $Ce(NO_3)_3$.

| | Weight (gram) |
|---|---|
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| heating | 70° C. for 17 hours |

In Example 6, Table 6, as shown in table below, empty water-core microcapsules were formed by adding a water phase to an oil phase I. An oil phase II was then added to the water-in-oil emulsion, a drop at a time, to produce a water-in-oil emulsion. The water-in-oil emulsion was then heated to about 70° C. to initiate a polymerization reaction. The water-in-oil emulsion was maintained at about 70° C. for a reaction time of about 20 hours to form these water-core microcapsules.

TABLE 6

Example 6 formula for empty water-core microcapsules.

| | Weight (gram) |
|---|---|
| Water Phase | |
| Water (pH ~2.8) | 80 |
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| Heating | 70° C. for 20 hours |

In Example 7, Table 7, sodium molybdate ($Na_2MoO_4$) was dissolved in water to produce a water phase. 4N $H_2SO_4$ was then added to the water phase, a drop at a time, until the pH of the water phase was about 2.3. An oil phase I was formed by dissolving the Lubrizol ADX101K in methyl myristate while mixing. The water phase was then added to the oil phase I, to produce a water-in-oil emulsion. An oil phase II was formed by adding CYMEL® U80 and PTT to methyl myristate and toluene while stirring. Oil phase II was then added to the water-in-oil emulsion, to produce a water-in-oil emulsion. The water-in-oil emulsion was then heated to about 70° C. to initiate a polymerization reaction. The water-in-oil emulsion is maintained at about 70° C. for a reaction time of about 17 hours to form water-core microcapsules having shells encapsulating a core of sodium molybdate dissolved in water.

TABLE 7

Example 7 formula for water-core microcapsules with sodium molybdate.

| | Weight (gram) |
|---|---|
| Water Phase | |
| Water (pH ~2.3) | 80 |
| $Na_2MoO_4 \cdot 2H_2O$ | 0.166 |
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| heating | 70° C. for 17 hours |

In Example 8, Table 8 the corrosion inhibitor sodium phosphate ($Na_3PO_4$) was dissolved in water to produce a water phase. 4N $H_2SO_4$ was then added to the water phase until the pH of the water phase was about 2.3. An oil phase I was formed by dissolving Lubrizol ADX101K in methyl myristate while mixing. The water phase was then added to the oil phase I to produce a water-in-oil emulsion. An oil phase II was formed by adding CYMEL® U80 and PTT to methyl myristate oil and toluene while stirring. Oil phase II was then added to the water-in-oil emulsion to produce a second water-in-oil emulsion. The second water-in-oil emulsion was then heated to about 70° C. to initiate a polymerization reaction. The second water-in-oil emulsion was maintained at about 70° C. for a reaction time of about 17 hours to form water-core microcapsules having shells encapsulating a core of sodium phosphate dissolved in water.

TABLE 8

Example 8 formula for water-core microcapsules with sodium phosphate.

| | Weight (gram) |
|---|---|
| Water Phase | |
| Water (pH ~2.3) | 80 |
| $Na_3PO_4$ | 0.113 |
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| heating | 70° C. for 17 hours |

In Example 9, Table 9, the corrosion inhibitor calcium metaborate ($CaB_2O_4$) was dissolved in water to produce a water phase. 4N $H_2SO_4$ was then added to the water phase until the pH of the water phase was about 2.3. An oil phase I was formed by dissolving Lubrizol ADX101K in methyl myristate while mixing. The water phase was then added to the oil phase I to produce a water-in-oil emulsion. An oil phase II was formed by adding CYMEL® U80 and PTT to methyl myristate oil and toluene while stirring. Oil phase II was then added to the water-in-oil emulsion. The water-in-oil emulsion was then heated to about 70° C. to initiate a polymerization reaction. The water-in-oil emulsion was maintained at about 70° C. for a reaction time of about 16 hours to form water-core microcapsules having shells encapsulating a core of calcium borate dissolved in water.

TABLE 9

Example 9 formula for water-core microcapsules with calcium metaborate.

|  | Weight (gram) |
|---|---|
| Water Phase | |
| Water (pH ~2.3) | 80 |
| $CaB_2O_4$ | 0.111 |
| Oil (I) | |
| Methyl Myristate | 200 |
| Lubrizol ADX 101K | 80 |
| Oil (II) | |
| PTT | 8 |
| U80 | 8 |
| Toluene | 40 |
| Methyl Myristate | 120 |
| heating | 70° C. for 16 hours |

Examples 10-11

Preparation of Hydrophilic-Core Microcapsules with Wall Forming Material in Hydrophilic Phase (e.g. Water Phase)

Figure 4:
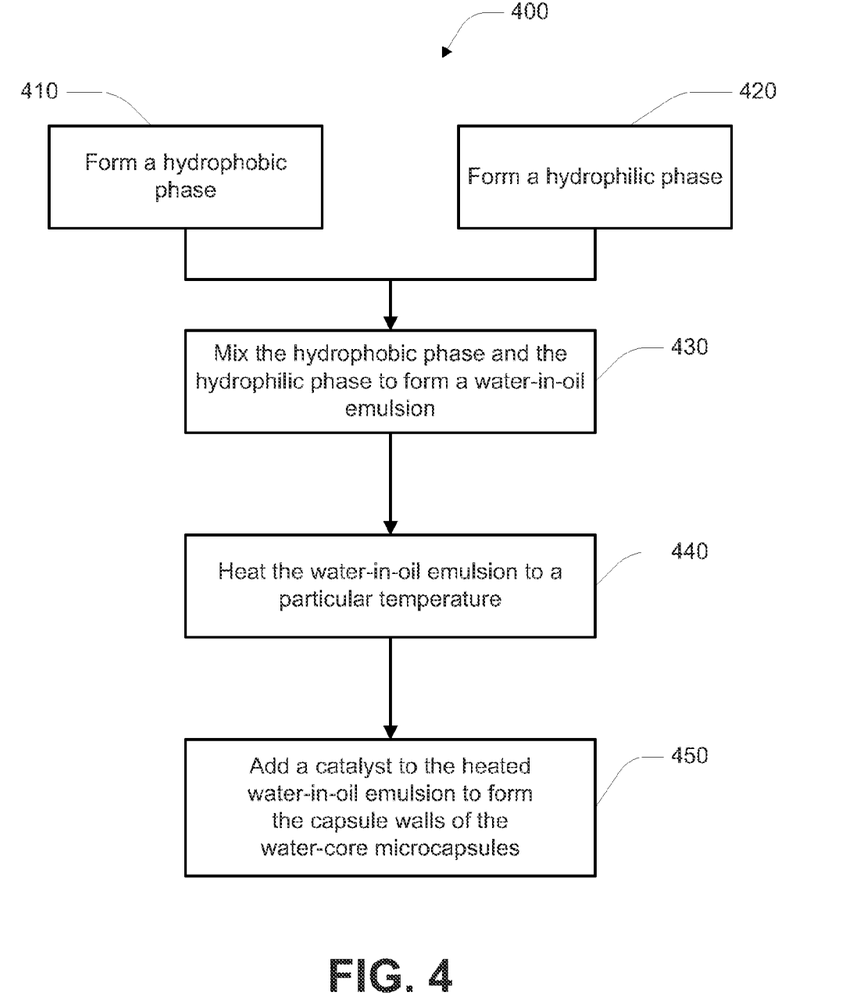
FIG. 4 presents a flowchart of a method for forming hydrophilic-core microcapsules, according to another embodiment.

FIG. 4 is flowchart of an example process 400 for forming hydrophilic-core microcapsules, according to another embodiment. For example, process 400 may be referred to as process of forming hydrophilic-core microcapsules with a wall forming material in a hydrophilic phase. A hydrophobic phase is formed at block 410, by mixing oil, such as methyl myristate, and a surfactant, such as an amide surfactant, e.g., using the Powergen500 homogenizer.

A hydrophilic phase is formed at block 420 by mixing water with a water-soluble shell-forming compound formed from a mixture of pre-polymers. For example, the shell-forming compound may be mixture comprising, consisting of, or consisting essentially of melamine, formaldehyde, and penta erythritol tetrakis(3-mercaptopropionate) (PTT). For some embodiments, the hydrophilic phase may also include triethanolamine. Note that the mixture of pre-polymers in the hydrophilic phase forms the shell (e.g., wall) of a finished water-core microcapsule. For other embodiments, the hydrophilic phase may include a co-solvent, such as ethanol, with a corrosion indicator, such as phenolphthalein, dissolved therein.

The hydrophilic phase is then added to the hydrophobic phase at block 430 to form a water-in-oil emulsion. For example, the hydrophilic phase may be mixed into the hydrophobic phase so that hydrophilic-phase droplets are dispersed within the hydrophobic phase. That is, the emulsion includes hydrophilic-phase droplets dispersed within a hydrophobic phase. As such, the hydrophilic-phase portion of the emulsion may be referred to as the dispersed phase, while the hydrophobic-phase portion of the emulsion may be referred to as the continuous phase. Note that shell-forming compound is contained in the dispersed phase (hydrophilic phase), as opposed to a shell-forming compound being contained in the continuous phase (hydrophobic phase).

For some embodiments, formation of the hydrophilic phase includes forming a mixture of water, a 37 percent formaldehyde solution, melamine, and triethanolamine, heating the mixture, e.g., to about 70° C., stirring the mixture, e.g., until clear, and adding the PTT to the mixture. The resulting mixture, e.g., after it turns clear, is added to the hydrophobic phase to form the water-in-oil emulsion.

The water-in-oil emulsion is then heated to a particular temperature, e.g., about 70° C., at block 440. A catalyst, e.g., an organic acid catalyst, such as stearic acid, is added to the heated water-in-oil emulsion at block 450, and the water-in-oil emulsion with the catalyst is maintained at the particular temperature for a particular time, e.g., a reaction time of about 2 to about 3 hours, as the water-in-oil emulsion reacts.

Note that the catalyst is added to the continuous phase of the emulsion. Adding the catalyst to the continuous phase prevents the catalyst from being encapsulated, as is the case when the catalyst is added to the dispersed phase. For example, encapsulating an acid catalyst may be undesirable for some applications, such as dispersing microcapsules containing acids in certain paints.

Examples 10-11

Preparation of Hydrophilic-Core (e.g., Water-Core) Microcapsules with Wall Forming Material in Hydrophilic Phase (e.g. Water Phase)

In Example 10, Table 10, empty water-core microcapsules were formed by forming an oil phase by mixing methyl myristate and an amide surfactant. For example, the oil phase may include methyl myristate and amide surfactant. The water phase was formed by mixing water, a 37-percent formaldehyde solution, melamine, and triethanolamine, heating the mixture to about 70° C., stirring the mixture until clear, and adding the PTT to the mixture. The resulting mixture, e.g., after it turned clear, was added to the oil phase to form the water-in-oil emulsion. The water-in-oil emulsion was heated to about 70° C. and stearic acid was added to the heated emulsion to initiate a polymerization reaction. The water-in-oil emulsion was maintained at about 70° C. for a reaction time of about 2 to about 3 hours to form water-core microcapsules having a size of about one micron.

TABLE 10

Example 10 formula for water-core microcapsules with water-soluble wall material.

| Reagent | Weight (gram) |
|---|---|
| Water Phase | |
| Water | 40 |
| melamine | 3.0 |
| Formaldehyde (37%) | 6.4 |
| PTT | 2 |
| Oil Phase (I) | |
| Methyl Myristate | 160 |
| Amide Surfactant | 5 |
| Catalyst | |
| Stearic Acid | 0.5 |

In Example 11, Table 11, water-core microcapsules containing the corrosion indicator phenolphthalein were formed by forming an oil phase by mixing methyl myristate and amide surfactant. The water phase was formed by mixing water, a 37-percent formaldehyde solution, melamine, and triethanolamine, heating the mixture to about 70° C., stirring the mixture until clear, and adding the PTT to the mixture.

After the resulting mixture turned clear, a solution of ethanol with phenolphthalein dissolved therein was added. The resulting mixture was added to the oil phase to form the water-in-oil emulsion. The water-in-oil emulsion was heated to about 70° C. and stearic acid was added to the heated emulsion to initiate a polymerization reaction. The water-in-oil emulsion was maintained at about 70° C. for a reaction time of about 2 to about 3 hours to form water-core microcapsules having shells encapsulating a core of phenolphthalein dissolved water and ethanol and having a size of about one micron.

TABLE 11

Example 11 formula for water-core microcapsules with water-soluble wall material.

| Reagent | Weight (gram) |
|---|---|
| Water Phase | |
| Water | 120 |
| melamine | 9.7 |
| Formaldehyde (37%) | 19.2 |
| PTT | 6.2 |
| Ethanol | 60.5 |
| Phenolphthalein | 4.6 |
| Oil Phase (I) | |
| Methyl Myristate | 477 |
| Amide Surfactant | 15.7 |
| Catalyst | |
| Stearic Acid | 1.5 |

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

We claim:

1. A method of forming hydrophilic-core microcapsules comprising:
   forming a single hydrophilic phase including at least one pre-polymer or monomer, a cross-linking agent, at least one active substance, an optional co-solvent, and water;
   forming a single hydrophobic phase including a hydrophobic substance and optionally at least one surfactant in the absence of any pre-polymer or monomer and in the absence of any cross-linking agent;
   mixing the hydrophobic phase with the hydrophilic phase to create and disperse droplets of the hydrophilic phase within the hydrophobic phase to form an emulsion; and
   initiating a reaction at an interface of the hydrophilic phase and the hydrophobic phase to form a solid shell encapsulating the hydrophilic phase forming hydrophilic-core microcapsules, wherein said solid shell includes a shell wall comprising a compound having one or more chemical bonds that are broken down when contacted with an alkali produced during a corrosion reaction causing the release of the hydrophilic phase, wherein said alkali has a pH above about 8.

2. The method of claim 1, wherein said at least one active substance is a corrosion indicator, a corrosion inhibitor, a film-forming compound, or combinations thereof.

3. The method of claim 1, including the further step of adding a surfactant to the emulsion.

4. The method of claim 3, wherein the surfactant comprises alkyl anhydride.

5. The method of claim 3, wherein the hydrophobic substance comprises methyl myristate.

6. The method of claim 1, wherein said cross-linking agent includes one or more ester groups.

7. The method of claim 6, wherein the cross-linking agent is selected from fully esterified monomers comprising ethyleneglycol di-2-mercapto acetate, ethyleneglycol di-2-hydroxyacetate, pentaerythritol tetrakis(2-hydroxyacetate), pentaerythritol tetrakis(3-hydroxypropionate) (PTT), pentaerythritol tetrakis(2-mercaptoacetate), pentaerythritol tetrakis(3-mercaptopropionate), or from any number of partially esterified polyols comprising glycerol monoacetate, neopentylglycol monopropionate, or trimethylolpropane diacetate.

8. The method of claim 1, wherein said at least one pre-polymer or monomer is selected from the group consisting of urea formaldehyde, melamine formaldehyde and other amine formaldehyde prepolymers, polyurethane prepolymers, polyols, isocyanates, urea and formaldehyde solution, melamine and formaldehyde solution, and other amine formaldehyde solutions.

9. The method of claim 1, including the further step of adding a catalyst to the emulsion.

10. The method of claim 9, wherein the catalyst is an acid.

11. The method of claim 10, including the further step of adding the acid catalyst until the emulsion has a pH in the range of about 2 to 5.

12. The method of claim 1, including the further step of heating the emulsion.

13. A method of forming hydrophilic-core microcapsules comprising:
   forming a hydrophilic phase including at least one active substance, a catalyst and water in the absence of any pre-polymer or monomer and in the absence of any cross-linking agent, wherein said catalyst is added until a pH of about 2 to about 4 is achieved;
   forming a first hydrophobic phase including at least one surfactant and a first hydrophobic substance in the absence of any pre-polymer or monomer and in the absence of any cross-linking agent;
   mixing the first hydrophobic phase with the hydrophilic phase to form an emulsion comprising droplets of the hydrophilic-phase dispersed in the first hydrophobic phase;
   forming a second hydrophobic phase including a cross-linking agent comprising one or more ester groups, a pre-polymer or monomer, and a second hydrophobic substance;
   mixing the second hydrophobic phase to said emulsion; and
   initiating a reaction at an interface of the hydrophobic phase and droplets to form a single solid shell encapsulating the hydrophilic phase forming hydrophilic-core microcapsules, wherein said single solid shell includes a shell wall comprising a compound having one or more chemical bonds that are broken down when contacted with an alkali produced during a corrosion reaction causing the release of at least the first hydrophilic phase, wherein said alkali has a pH above about 8.

14. The method of claim 13 wherein said at least one active substance is a corrosion indicator or a corrosion inhibitor.

15. The method of claim 14, wherein said at least one active substance is a corrosion inhibitor and said hydrophilic phase includes about zero to about 10 percent, by mass, corrosion inhibitor and about 90 to about 100 percent, by mass, water.

16. The method of claim 13, wherein said first hydrophobic phase includes about 70 to about 90 percent, by mass, oil and about 10 to about 30 percent, by mass, surfactant.

17. The method of claim 13, wherein said second hydrophobic phase includes about 88 to about 92 percent, by mass, oil; about 4 to about 7 percent, by mass, pre-polymer; and about 4 to about 5 percent, by mass, cross-linking agent.

18. The method of claim 13, wherein said emulsion including said second hydrophobic phase includes about 40 to about 55 percent, by mass, the first hydrophobic phase; about 30 to about 35 percent, by mass, the second hydrophobic phase; and about 10 to about 30 percent, by mass water.

19. The method of claim 13, wherein said reaction proceeds for about 3 to about 5 hours.

20. The method of claim 1, wherein said shell wall includes about 20 percent to about 50 percent, by mass, cross-linking agent and about 50 percent to about 80 percent, by mass, pre-polymer.

21. The method of claim 1 wherein said hydrophilic phase consists of formaldehyde, melamine, a cross-linking agent, at least one active substance, an optional co-solvent, and optional surfactant and water.

22. The method of claim 1, wherein said cross-linking agent is pentaerythritol tetrakis (3-mercaptopropionate).

23. The method of claim 1, wherein said hydrophilic phase is formed including the steps of:
    mixing water and said at least one pre-polymer to form a first mixture, and then heating said first mixture to about 70° C. with stirring;
    adding said cross-linking agent to said first mixture forming a second mixture; and
    adding said at least one active substance to said second mixture.

24. The method of claim 13 wherein
    said hydrophilic phase consists of at least one active substance, a catalyst, and water;
    said first hydrophobic phase consists of at least one surfactant and a first hydrophobic substance; and
    said second hydrophobic phase consists of a cross-linking agent comprising one or more ester groups, a pre-polymer, and a second hydrophobic substance.

* * * * *